United States Patent [19]

Lopatin et al.

[11] Patent Number: 4,550,123
[45] Date of Patent: Oct. 29, 1985

[54] THERMALLY PLASTIFIABLE COMPOSITIONS FOR MICROPOROUS SORBENT STRUCTURE

[75] Inventors: George Lopatin, Newton; Myron J. Coplan, Natick; James P. Walton, Jr., Newton, all of Mass.

[73] Assignee: Albany International Corp., Albany, N.Y.

[21] Appl. No.: 615,672

[22] Filed: Jun. 1, 1984

Related U.S. Application Data

[60] Continuation of Ser. No. 531,623, Sep. 12, 1983, which is a division of Ser. No. 108,178, Dec. 28, 1979, Pat. No. 4,342,811.

[51] Int. Cl.$^4$ .............................................. C08J 9/28
[52] U.S. Cl. ...................................... 521/64; 521/82; 521/98; 521/143
[58] Field of Search ...................... 521/64, 82, 98, 143

[56] References Cited

U.S. PATENT DOCUMENTS

| | | | |
|---|---|---|---|
| 2,915,483 | 12/1959 | Barnhart | 521/62 |
| 3,308,013 | 3/1967 | Kepple | 521/64 |
| 3,351,495 | 11/1967 | Larson et al. | 521/64 |
| 3,375,208 | 3/1968 | Duddy | 521/64 |
| 3,407,249 | 10/1968 | Landi | 521/61 |
| 3,536,796 | 10/1970 | Rock | 521/61 |
| 3,607,793 | 9/1971 | Mahlmon | 521/98 |
| 3,842,519 | 10/1974 | Lepidos | 428/306 |
| 3,865,674 | 2/1975 | Duling | 521/64 |
| 3,865,758 | 2/1975 | Yoshida et al. | 521/64 |
| 3,954,927 | 5/1976 | Duling | 521/64 |
| 4,100,238 | 7/1978 | Shimomura | 521/61 |
| 4,182,582 | 1/1980 | Youval et al. | 264/45.3 |
| 4,237,083 | 12/1980 | Young et al. | 521/64 |
| 4,342,811 | 8/1982 | Lopatin | 521/63 |

FOREIGN PATENT DOCUMENTS

1327602  8/1973  United Kingdom .

OTHER PUBLICATIONS

Zwick, "Spinning of Fibers From Polymer Solutions Undergong Phae Separation" Applied Polymer Symposia, No. 6 pp. 109-149 (1967).
Williams, "Phase Separation Spinning of Polypropylene" SPE Journal, vol. 28, pp. 51-54, Oct. 1972.
"Technical Proposal" Dated Jul. 15, 1980, Myron J. Coplan et al (Response to RFP DAAK60-80-ROO34).
Article by Williams, Matthew C. And Fricke, A. L., "Phase Separation Spinning Of Polypropylene", S.P.E. Journal, vol. 28, pp. 51-54 (Oct. 1972).
Paper By Andrade, Carlos A. And Fricke, Arthur L., "Manufacture And Characterization Of Porous Polypropylene Fibers", Distributed At the Annual Technical Meeting Sponsored By Society Of Plastic Engineers Held On May 7-10, 1979.
Zwick, "Spinning of Fibers From Polymer Solutions Undergoing Phase Separation, I. Practical Considerations And Experimental Study".

*Primary Examiner*—Morton Foelak
*Attorney, Agent, or Firm*—Kenway & Jenney

[57] ABSTRACT

Textile quality polymeric fibers and thin films that are highly sorbent for organic and other vapors, mists and solutes. The fibers and films comprise a polymeric matrix with a system of interconnecting micropores, and are highly loaded with particulate sorbents such as activated carbon. The fibers and films are manufactured by forming a melt blend of the sorbent particles, the polymer and a selected diluent, spinning or extruding and drawing down the fiber of film, and extracting the diluent. The diluent functions to permit a high spin or extrusion draw down, to permit the subsequent cold drawing of fibers highly-loaded with active carbon, and to permit the fiber or film to be porosified. Optionally, the diluent may be extracted after or before cold drawing, or without any cold drawing. The fibers and films are highly sorbent, are strong and durable and exhibit substantial strength over an appreciable degree of elongation.

4 Claims, No Drawings

THERMALLY PLASTIFIABLE COMPOSITIONS FOR MICROPOROUS SORBENT STRUCTURE

This is a continuation of Ser. No. 531,623, filed Sept. 12, 1983 which is a division of application Ser. No. 108,178, filed Dec. 28, 1979 now U.S. Pat. No. 4,342,811.

CROSS-REFERENCE TO RELATED APPLICATION

This application has partially common inventorship with copending application of Myron J. Coplan and George Lopatin Ser. No. 014,071 filed Feb. 22, 1979, now abandoned, and entitled "Sorbent-Cored Textile Yarns and Methods of Fabricating Same."

BRIEF SUMMARY OF THE INVENTION

This invention relates generally to textile quality polymeric fibers and thin polymer films which are highly sorptive for organic vapors, mists, solutes, and in particular, noxious or harmful substances in these forms. More specifically, the invention relates to polymeric fibers and films that incorporate a substantial amount of active sorptive materials throughout the fiber or film structure with high retention of activity, and methods of fabricating the same.

A principle object of this invention, as applied to yarns, is to produce highly sorbent monofilament or multifilament yarns or staple fibers having properties suitable for textile uses generally. Such qualities include, for example, a denier satisfactory for fabric handle, adequate tensile strength for processing and use, substantial elongation to the breaking point, good recovery from a moderate extension, and generally textile fiber-like durability. It is desirable that the fibers retain the sorptive constituents in an active state through repeated wearing and cleaning, and that the sorptive properties may be renewed.

An object of the invention is to provide fibers and films suitable for use as protective clothing, coverings or the like, containing sorptive media or species capable of sorbing vapors, liquids and solutes to a high percentage of the weight of such media. For this purpose it is desirable not only that the sorptive media be present in a highly active form, but also that the media comprise a substantial quantity per unit weight of the fibers or films in which they are contained.

As noted above, it is important that the sorptive materials are securely retained within the body of the fibers or films so as not to be dislodged in ordinary usages. This in turn imposes a requirement upon the polymeric matrix, namely, that such matrix must permit the ready permeation of materials to be sorbed, so as to have ready access to the sorptive constituents.

Past efforts at incorporating sorptive materials in polymeric fibers or film-forming polymers have produced undesirably low levels of sorption capacity. One of the problems has been that when such sorptive materials as active carbon particles have been loaded in polymers, difficulties have arisen in spinning and drawing filaments, except at relatively low levels of carbon loading. As a result, carbon or other pigment loading of only about 10 to 12 percent has been commonly accepted as a limit for extrusion of such materials. When a greater percentage is loaded, spinneret orifices often tend to become plugged due to poor flow, or the spin line breaks during the draw-down. This is often avoidable only by using a larger spinning orifice than desired.

Another problem is that the active media when incorporated in a polymeric matrix exhibit little or no sorption capability, apparently due to the fact that the polymer occludes access to the internal pore structure of the sorptive particles in the finished fiber or film.

Active carbon fibers have been produced, and while some of these do not exhibit the problems of occlusion mentioned above, they are very friable and are not suitable for ordinary or typical textile uses.

With a view to achieving the above-mentioned objects and overcoming the limitations of the prior art, this invention, as embodied in yarns of textile quality, features filaments or fibers that consist of a microporous polymeric body highly loaded with active sorbent particles dispersed throughout, such particles comprising a substantially higher percent of the fiber composition than hitherto achieved and being in a highly active state in said body Also, sheets or films may be formed comprising such a microporous polymeric body with similar loading.

In the manufacture of such filaments or films, this invention features a process by which the sorptive particles are blended with a selected extractable, phase separable diluent as well as the polymeric material. The diluent material serves a plurality of functions: it renders the polymeric matrix microporous; it allows heavily pigment-loaded fiber to be cold drawn to produce suitable mechanical properties for a textile; and it allows a very high draw-down from the melt so that fine spinning orifices are not needed to make fine yarns.

Other features of the invention comprise particular materials, compositions and methods that will be evident from the following description.

DETAILED DESCRIPTION

The product of this invention comprises a microporous polymeric body with actively sorbent particles dispersed throughout the body. The particles are characterized by highly active sorbency when incorporated in the polymeric body, with minimal occlusion of the sorbent particle surfaces or internal structure by the polymer. The particles comprise a high percentage of the total weight of the body as compared with sorbent-loaded yarns and films in the prior art, for example more than 10% and up to 50% of the weight of the finished fiber.

The products of this invention may comprise fibers or filaments suitable for making yarns for many ordinary textile uses, as well as thin polymeric films used as protective sheaths, coverings, linings or the like. The fibers may be felted, or the yarns may be woven, knitted or otherwise employed as textile yarns generally. Fibers may also be chopped or otherwise comminuted and assembled in paper-like sheets, pads or other molded forms.

For the manufacture of sorbent bodies according to this invention, we prefer to use a sorbent material which comprises, for example, active carbon particles, silica gel, or other particles of molecular filter-type materials. The diluting material, for example paraffin wax, is a material that is apparently (a) compatible with the polymer at melt spinning temperatures, (b) separable from the polymer into a fine, distinct phase upon cooling, and (c) extractable to produce the desired open-cell porous configuration in the polymer matrix. For example, paraffin wax, being crystallizable, has the property of separating out of the polymer at room temperature so that, upon extraction in a later step, mutually interconnected pores are dispersed throughout the body of the polymer. The polymer may comprise any of a large number of materials used in textiles or films. A preferred material is polypropylene.

A blend of sorbent material, diluent and polymer is physically mixed in a suitable batch-type blender or blending extruder. The order of addition is not critical and may be chosen to facilitate the use of the particular mixing apparatus. When either of the foregoing types of mixing equipment is employed, the presence of the diluent is apparently effective to prevent the polymer from occluding the pore system of the sorbent particles.

The mixture so formed is extruded through fine orifices to form filaments or fibers, or through fine slits to form thin polymeric sheets or films. The extrudates so formed may be attenuated by conventional methods, including both spin draw-down from the melt up to 1,000:1 for example; and if desired, subsequent drawing in solid form up to 10:1 for example.

The yarns, fibers or films so formed are extracted with a suitable solvent or solvents for removal of the diluent. This extraction porosifies the polymer, leaving the sorbent particles in an active state accessible to vapors, liquids or solutes present on or at the surface of the matrix.

Fibers produced according to this invention may be drawn in solid form (cold drawn) from 2:1 to 15:1 in many cases, and may have a denier of from one to 1,000, with a final diameter of between 0.001 and 0.020 inch. Likewise, films may be formed with thicknesses ranging from 0.001 to 0.020 inch.

EXAMPLE 1

A preferred example of the invention consisted in forming textile filaments of microporous polypropylene in which were embedded active carbon particles. The carbon particles comprised 17% by weight of the finished fiber. The diluent was paraffin wax having a melting point of 55° C.

A mixture was formed comprising 61% polypropylene, 26% paraffin wax and 13% active carbon (Amoco PX21 Super Sorb), all percentages being by weight. The paraffin wax was first added to a Sigma blade mixer and heated to melting, and the active carbon particles were then added. After initial mixing, the mixture was heated to 230° C. and the polypropylene was then slowly added and the mixing continued until uniform.

The mixture was then cooled, chopped and melt spun on a one-inch fiber spinning extruder with a spinneret having eleven orifices each of 0.080 inch diameter, at 175° C., to form a multifilament yarn. The fibers were subjected to a spin drawdown of about 60:1 at 150 feet per minute. The extruder output was 0.4 pounds per hour.

The yarn was then drawn in solid form at about a 5:1 draw ratio at 75° C. Finally it was extracted in a Soxhlett apparatus with pentane, and dried under vacuum.

The resulting yarn had a total denier of 96 (8.8 denier/filament) and showed the following mechanical properties:

| Tenacity | 2.7 g/den |
| --- | --- |
| Elongation to break | 23% |

The yarn produced in this example exhibited a remarkable sorption capability for organic mists, aerosols, solutes, vapors and gases. The physical and chemical phenomena attending this desirable result are not yet fully understood at the dimensional scales of either the polymer molecules or the micropores in the matrix. It appears clear that the surfaces of the sorptive particles were sufficiently open to permit efficient sorption. The results are illustrated by tests in a saturated atmosphere of carbon tetrachloride. The particulate active carbon particles, when in an unmixed state freely exposed to this atmosphere, absorbed 200 to 210 percent of their weight in carbon tetrachloride. As stated above, particles of the same type employed in the manufacture of fibers in this example resulted in the fibers having 17 percent by weight of the carbon based on the total weight of the fibers after extraction. Measurements were made of the sorption capability of the resulting fibers, both with and without cold drawing (drawing in solid form as described above) in the same atmosphere. After cold drawing and extraction, the fibers picked up 26% of their weight in carbon tetrachloride. After extraction but without cold drawing, they picked up 33 percent of their weight in carbon tetrachloride. Since the carbon comprised only 17 percent of the total weight of the fibers, this indicated that especially in the latter case, there was little if any occlusion of the pore structure of the carbon by the polypropylene.

EXAMPLE 2

A blend of 58 parts by weight of polypropylene, 25 parts by weight of paraffin having a melting point of 55° C., and 17 parts active carbon (Amoco PX21 Super Sorb), was prepared by compounding the components in a twin-screw compounding extruder having a die temperature of 232° C. The feeding rates of the various components into the extruder were adjusted so that the above blend was obtained.

The extrudate was chopped and then spun into a monofilament at a take-up speed of 48 feet per minute. The filament was then extracted with pentane in a Soxhlett apparatus, and dried under vacuum. The resulting filament contained 23 percent by weight of the carbon and picked up 45 percent of its weight of carbon tetrachloride.

The importance of the diluent in the process of this invention is illustrated by the following example.

EXAMPLE 3

A mixture of 87 parts by weight of polypropylene and 13 parts by weight of active carbon (Amoco PX21 Super Sorb) was blended in a Sigma blade mixer at 230° C. until the blend appeared homogeneous. The mixture was cooled, chopped and spun into a monofilament with a take up speed of 46 feet per minute. The filament was then extracted with hexane in a Soxhlett apparatus, and dried under vacuum at 90° C. After extraction, the filament was capable of picking up only 2 percent of its weight in carbon tetrachloride.

Some of the same filament, after extraction, was then drawn to a draw ratio of 3:1 at 88° C. to produce a filament having about 0.003 inch diameter, and in this form the filament was capable of picking up only 7.0 percent of its weight in carbon tetrachloride.

It will be understood that in the practice of this invention, the extraction of the diluent may be carried out either before or after the fibers have been cold drawn or have been incorporated in a finished product such as a textile fabric.

I claim:

1. A thermally plastifiable composition suitable for producing microporous polymeric bodies, having sorbent properties, comprising a mixture of a thermally plastifiable polymer, a diluent compatible with the polymer to form a uniform molten blend with the polymer at temperatures above the fusion temperature of said polymer and phase separable from the polymer into an interconnected fine distinct phase within the formed bodies upon cooling to room temperature and extractable therefrom to produce an open-cell microporous structure therein, and activated carbon particles dispersed in the mixture and retaining a high degree of sorbent activity.

2. A composition according to claim 1, in which the sorbent particles are present in an amount sufficient to comprise between 10 and 50 percent by weight of the bodies after extraction of the pore-forming material.

3. A composition according to claim 1, in which the mixture is capable of extrusion orifices to produce the formed bodies.

4. The thermally plastifiable composition of claim 1 wherein said sorbent is characterized by its capability of absorbing significant amounts of carbon tetrachloride vapor.

* * * * *

UNITED STATES PATENT AND TRADEMARK OFFICE
CERTIFICATE OF CORRECTION

PATENT NO. : 4,550,123

DATED : October 29, 1985

INVENTOR(S) : George Lopatin et al.

It is certified that error appears in the above-identified patent and that said Letters Patent is hereby corrected as shown below:

Column 6, line 8, Claim 3, after "extrusion" insert

-- through --.

Signed and Sealed this

Fourth Day of February 1986

[SEAL]

Attest:

Attesting Officer

DONALD J. QUIGG

Commissioner of Patents and Trademarks